Figure 1:
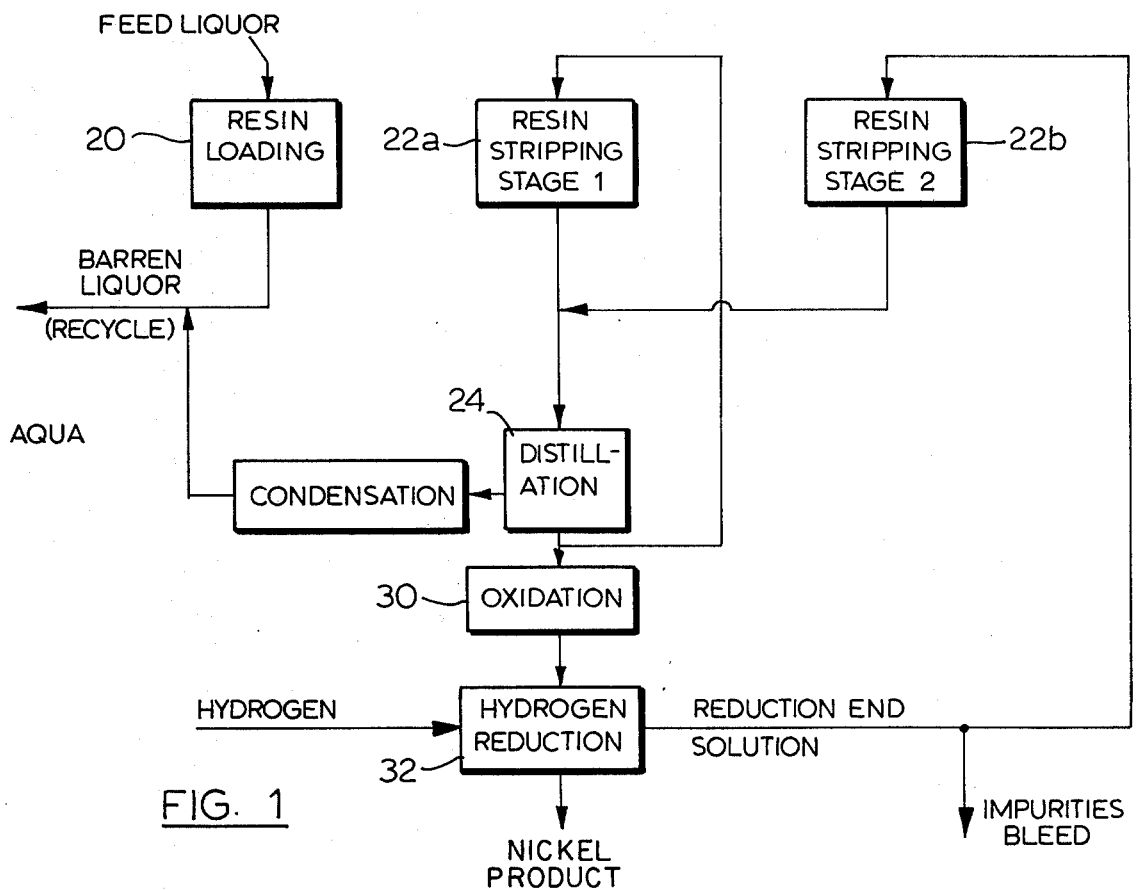

United States Patent [19]

Weir et al.

[11] 3,998,627
[45] Dec. 21, 1976

[54] PROCESS FOR RECOVERING METALS FROM METAL AMMINE BEARING AMMONIUM SALT SOLUTIONS USING ION EXCHANGE RESIN

[75] Inventors: Donald Robert Weir, Fort Saskatchewan; Verner Blakely Sefton, Edmonton, both of Canada

[73] Assignee: Sherritt Gordon Mines Limited, Toronto, Canada

[22] Filed: June 6, 1974

[21] Appl. No.: 476,959

[30] Foreign Application Priority Data
Apr. 11, 1974 Canada .................. 197458

[52] U.S. Cl. .................. 75/101 BE; 75/108; 75/117; 75/119; 75/121; 423/24; 423/100; 423/139

[51] Int. Cl.² .................. C22B 3/00; C22B 15/10; C22B 23/04; C22B 17/04

[58] Field of Search .............. 423/24, 100, 139; 75/101 BE, 119, 108, 117, 121; 210/26, 28, 34

[56] References Cited

UNITED STATES PATENTS

| | | | |
|---|---|---|---|
| 2,660,558 | 11/1953 | Juda | 210/34 |
| 2,734,821 | 2/1956 | Schaufelberger | 75/108 |
| 2,822,263 | 2/1958 | Forward | 75/108 |
| 2,831,763 | 4/1958 | Nashner et al. | 423/24 X |
| 2,848,322 | 8/1958 | Conn et al. | 75/119 |
| 3,003,866 | 10/1961 | Mattano et al. | 423/24 |
| 3,235,377 | 2/1966 | Hard | 423/139 X |
| 3,448,043 | 6/1969 | Vajna | 423/139 X |

OTHER PUBLICATIONS

MacNevin et al. "Behavior of Platinum Group Metals Toward Ion Exchange Resins" *Analytical Chemistry*, vol. 25, No. 11, 1953, pp. 1628–1630.

*Primary Examiner*—Oscar R. Vertiz
*Assistant Examiner*—Brian E. Hearn
*Attorney, Agent, or Firm*—Frank I. Piper; Arne I. Fors; Robert F. Delbridge

[57] ABSTRACT

A process is described for recovering metals which are present in aqueous solution as complex metal ammine ions having an ammonia co-ordination of at least two. According to the process, the complex metal ammine bearing solution is contacted with a cationic ion exchange resin in the ammonium form to effect loading of the complex metal ammine ions from the solution onto the resin. The loaded resin is then stripped by contacting it with a controlled volume of aqueous ammonium salt stripping solution having an ammonium ion concentration of at least two molar. The free ammonia and ammonium salt concentrations in the stripping solution are controlled such that the controlled volume of stripping solution is effective to substantially completely strip the free ammonia and metal values from the resin.

19 Claims, 3 Drawing Figures

PROCESS FOR RECOVERING METALS FROM METAL AMMINE BEARING AMMONIUM SALT SOLUTIONS USING ION EXCHANGE RESIN

This invention relates to the recovery of metals from aqueous solutions by means of ion exchange techniques. More particularly, the invention relates to an ion exchange process for recovering metals, such as nickel, cobalt, copper, zinc and cadmium which are present in solution as complex ammine ions.

Various processes are known and in use for recovering metal values from solutions in which they are present as soluble complex amines. Most of these involve chemical precipitation of the metal values either selectively or as bulk precipitates followed by further treatment of the solution and/or precipitates to separately recover valuable reagents and the desired metal or metals. Such processes are often technically complicated and the purity of the products less than satisfactory particularly where the solutions treated contain many different impurities as is the case with most solutions derived from leaching complex ores and concentrates. Moreover, most of these precipitation processes require large quantities of energy and/or large quantities of chemical reagents, many of which are nonregenerative. In addition to the effect on costs, this often creates disposal problems which can be particularly serious in view of the increasingly stringent government regulations concerning industrial pollution of the environment.

It is known that metal values can be selectively extracted from solutions of various kinds by absorption on an ion exchange resin. The metal values can then be stripped from the resin and recovered in a solution relatively free of the impurities associated with the metal values in the initial solution. Although various proposals have been made for utilizing such ion exchange methods as an alternative to the chemical precipitation methods of metals recovery, problems are encountered in utilizing the technique for commercial scale recovery of metals which are present in ammonium salt solutions as complex amines. The main drawback of most of the known ion exchange metals recovery techniques is that unless stripping of metal values from the resin is effected with an acid solution, stripping of the resin is incomplete and/or the volume of solution required for substantially complete stripping of the resin is so large that the metal concentration in the final stripping solution is too low to permit economic recovery of the metal directly therefrom by known methods. The use of an acid solution for stripping the resin results in other problems in the case where the metal has been loaded onto the resin from an ammoniacal metal ammine solution. Firstly, because both the metal and the ammonia complexed with it are absorbed by the ion exchange resin, stripping with acid results in the generation of large amounts of heat and in the production of a large quantity of ammonium salt, particularly where the ammonia co-ordination of the metal ammine is four or more. The result is that large amounts of ammonia and acid are consumed in the stripping process.

Another disadvantage of acid stripping is that with some of the resins which have been loaded from an ammoniacal ammine system, the change from the ammoniacal system for metal loading to the acid system for metals stripping results in substantial volume changes in the ion exchange resin with the result that the resin tends to break down and become unusable after a relatively short number of absorption-regeneration cycles.

According to the present invention, these problems are avoided and ion exchange techniques are utilized to particular advantage to provide a commercially practical and economic method for recovery of metal values from aqueous ammoniacal ammonium salt solutions in which they are present as complex ammines having an ammonia co-ordination of at least two by: contacting said aqueous solution with a cationic ion exchange resin in the ammonium form to effect loading of said resin with complex metal ammine ions from said solution, separating the resulting complex metal ammine ion-depleted solution from the resulting loaded resin and contacting said loaded resin with a controlled volume of aqueous ammonium salt stripping solution having an ammonium ion concentration of at least two molar to strip ammonia and metal values from said resin, controlling and co-relating the free ammonia* and ammonium salt concentrations in said stripping solution such that said controlled volume of stripping solution is effective to substantially completely strip the free ammonia and metal values from the resin.

* "free ammonia" or "NH$_{3F}$" means uncombined ammonia and ammonia combined as metal ammine ions.

The process is based on the finding that it is possible to treat metal ammine bearing ammonium salt solutions in an ion exchange metal absorption circuit and then also effect substantially complete stripping of absorbed metal with a predetermined volume of ammonium salt solution by carefully controlling the ammonium ion, free ammonia and metal concentrations in the stripping solution such that the equilibrium loading of metal on the ion exchange resin from the metal stripping solution is lower than the concentration of metal already on the resin. This has the effect of decreasing the affinity of the resin for metal in the ammonium salt stripping solution as compared to the ammonium salt solution from which the metal is loaded onto the resin, thus driving the equilibrium of the absorption-regeneration reactions in the direction of metal desorption. The precise manner in which the free ammonia, ammonium ion and metals concentrations are controlled and corelated in a given case to produce the desired results depends on a number of factors including the free ammonia to metal molar ratio of the complex ammine ions loaded onto the resin and the metals concentration desired in the product liquor produced in the resin stripping operation. In general, the higher the NH$_{3F}$/metal molar ratio of the complex ammine ions on the resin, the lower the NH$_{3F}$ concentration that is required in the stripping solution to achieve a given metals concentration in the product liquor from the stripping step. Also, while the NH$_4^+$, metals and NH$_{3F}$ concentrations in the stripping solution interdependently affect the stripping efficiency of the solution, the NH$_{3F}$ has by far the most pronounced affect on the stripping ability of a solution containing all of these components. Thus, as a practical matter in the practice of the invention, efficient stripping of resin with controlled volumes of stripping solution is obtained in most cases through control of NH$_{3F}$ concentration in the stripping solution. This control normally is achieved by distillation of free ammonia and/or by a combination of distillation and acid neutralization. The ammonium ion concentration is controlled by upward or downward adjustment of the ammonium salt content of the fresh stripping solution supplied to the stripping operation and metals concentration is controlled by control of the volume of fresh stripping solution in relation to the quantity of metal that is to be removed from a given quantity of resin.

The resin stripping operation may be conducted as a single stage "once through" operation or as a multi-stage operation. The multi-stage operation is preferred since, as will be explained in more detail hereinbelow, it enables substantially complete stripping of metal from the ion exchange resin with a predetermined volume of stripping solution. This, in turn, permits maximum utilization of the metal absorptive capacity of the resin and, at the same time, permits recovery of metal values in a solution at any predetermined concentration which may be selected to facilitate subsequent recovery of the metal therefrom.

The process of the invention permits efficient extraction of metal values from any ammoniacal ammonium salt feed solution containing the metal values as complex ammines having the formula $ME(NH_3)_x$ where Me is any metal capable of forming a water soluble complex ion with ammonia and $x$ is 2 or more. The ammonium salt may, for example, be ammonium sulphate, carbonate, chloride, nitrate or acetate. The ammonium salt component in the stripping solution may be the same as that of the feed solution or it may be different. For example, both the feed solution and the stripping solution may be ammonium sulphate solutions or the feed solution can be ammonium carbonate and the stripping solution ammonium sulphate. The choice of stripping solution will depend primarily on the type of metal being recovered and the type of solution that is desired for subsequent processing steps. For example, where the metal values to be recovered are nickel, cobalt, copper or cadmium, a preferred procedure is to utilize an ammonium sulphate solution and to produce a stripping solution containing about 40–80 g.p.l. of dissolved metal. Such a solution is ideally suited for treatment by direct hydrogen reduction for production of high purity elemental nickel, cobalt, copper or cadmium powder and concurrent production of an ammonium sulphate reduction end solution which can be recycled and used for the stripping operation. In most cases, the process will be operated to simultaneously provide an upgrading of metals concentration from the feed solution to the stripping solution and to separate the extracted metal from all or a substantial portion of the impurities associated with it in the feed solution.

The resin loading and stripping steps of the ion exchange operation advantageously are carried out batchwise in fixed-bed systems. The resin is contained in upright, elongated cylindrical columns in which it remains stationary during the loading and stripping operations. Suitable piping and valving is provided to permit controlled flow of solutions through the resin beds in either an up-flow or a down-flow mode.

The resin employed in the process is any cationic ion exchange resin which is capable of absorbing complex metal ammine ions from ammoniacal ammonium salt solutions. Particularly suitable resins are the strongly cationic sulphonated styrene-divinylbenzene copolymer resins in the ammonium salt form. Spherical beads of resin in a size range between about 50–100 mesh to 20–50 mesh are preferred because of their stability and ease of handling. The more highly cross linked grades of resin are preferred because of their superior mechanical stability. Suitable resins are commercially available under various brand names such as DOWEX 50WX8, a product of Dow Chemical Company; AMBERLITE 124, a product of Rohm & Haas Co, LEWATIT SP 120, a product of Farbenfabriken Bayer AG and IONAC CFZ a product of Ionac Chemical Company.

Figure 2:
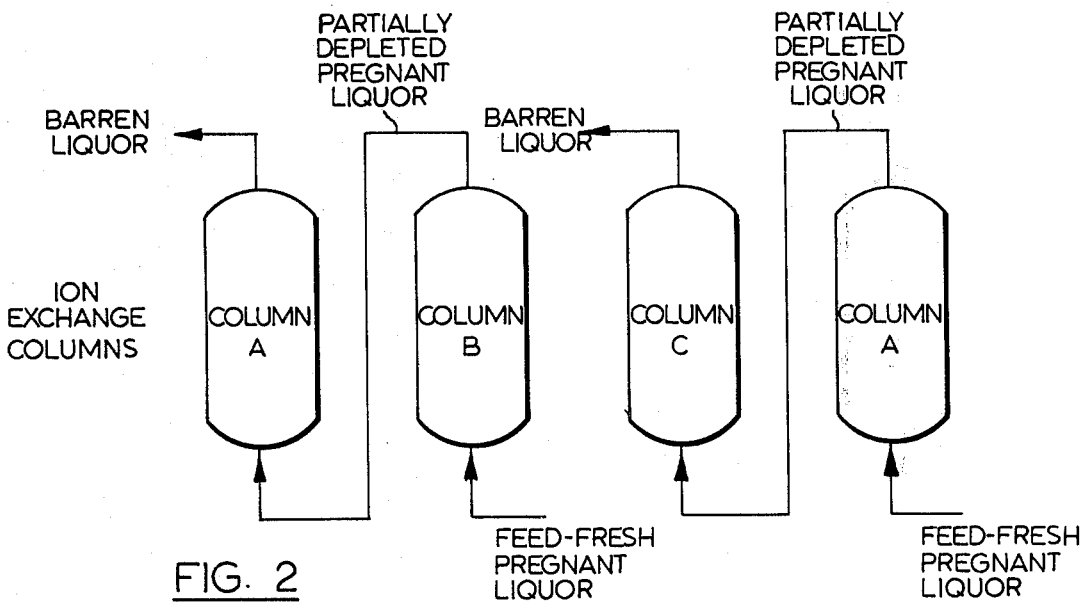
Figure 3:
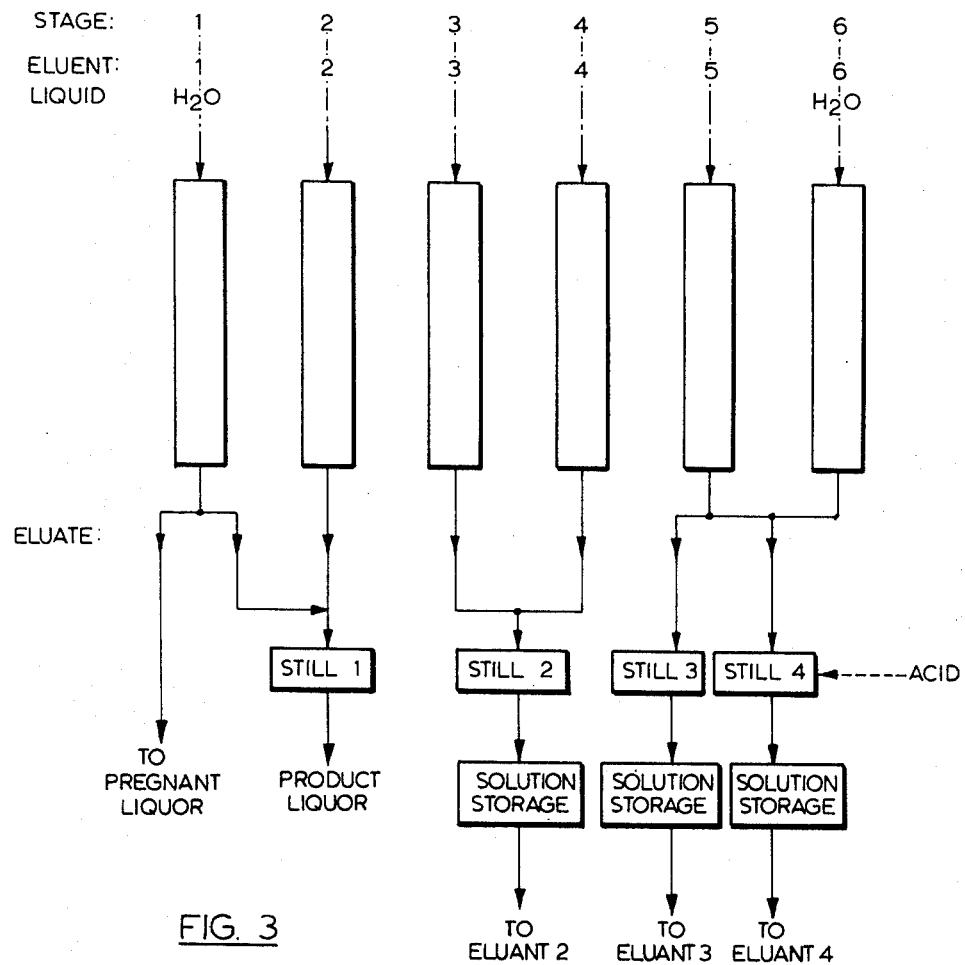

The process of the invention is further explained and illustrated below with reference to the accompanying drawings in which:

FIG. 1 is a simplified schematic block flow diagram illustrating a preferred embodiment of the process of the invention; and FIGS. 2 and 3 are schematic diagrams illustrating a preferred mode of effecting loading and stripping respectively of the ion exchange resin.

In its broadest aspect, the process of the invention is independent of the origin or manner of preparation of the metal amine bearing ammonium salt solution which is to be treated for recovery of the metal values. However, the process can be employed with particular advantage for recovering nickel from solutions derived from aqueous ammoniacal ammonium carbonate leaching of reduction roasted lateritic ores by methods such as those described in Canadian patents Nos. 811,078 and 900,179, for example. Such leach solutions which, in most cases, contain, in addition to 3–20 grams per liter (g.p.l.) of dissolved nickel, impurities such as sulphur, chlorine, cobalt, copper, magnesium, manganese, zinc, iron and silica, may be advantageously treated as shown in FIG. 1.

The process illustrated includes five basic operations. These are: (1) ion exchange resin loading indicated by numeral 20; (2) two-stage ion exchange resin stripping indicated by numerals 22(a) and 22(b); (3) ammonia distillation and adjustment 24; (4) product solution oxidation 30; and (5) hydrogen reduction 32.

In the resin loading step 20 (sometimes referred to as absorption), the ion exchange resin absorbs nickel and ammonia and a certain amount of impurities from the feed (commonly called pregnant liquor) which typically will contain 3–20 g.p.l. Ni as $Ni(NH_3)_6^{++}$, 70–80 g.p.l. $NH_3$ and 40–70 g.p.l. $CO_2$. The barren liquor from the loading operation 20, containing only a small amount of nickel (e.g. 0.02–0.05 g.p.l.) but rich in ammonia (typically 60–70 g.p.l.) and carbon dioxide (e.g. 40–70 g.p.l.) is preferably recycled to the last residue wash thickener of the leaching circuit (not shown) from which the feed liquor is derived.

In the absorption step 20, the nickel is absorbed as an ammine complex onto the resin which is in the ammonium salt form. This is depicted by the following equation:

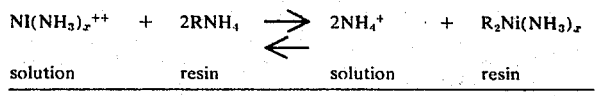

The stripping step (sometimes referred to as regeneration) is carried out in two stages 22(a) and 22(b). The resin is stripped of its nickel and ammonia as well as impurities content by a stripping solution as depicted by the following equation:

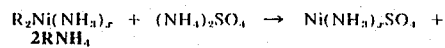

The influent (eluant) for the first stripping stage 22(a) is recycled effluent (eluate) from the first and second stripping stages which has been treated in distillation step 24 to adjust the $NH_{3F}/Ni$ molar ratio to about 2.0–2.5. Since the recycled liquor has a relatively low $NH_{3F}/Ni$ molar ratio when it is contacted with the fully loaded resin in stripping stage 22(a), it is effective to strip ammonia and some nickel from the resin until the equilibrium loading of nickel and ammonia from the stripping solution is equal to the concentration of nickel on the resin. The effluent (eluate) from the stripping stage 22(a) is then passed to the distillation step 24 along with eluate from second stripping stage 22(b) where sufficient ammonia is distilled off to adjust the $NH_{3F}/Ni$ molar ratio to about 2.0 again. The unrecycled portion of the liquor from this ammonia adjustment step constitutes the product liquor which is passed to the oxidation step 30 and thence to the hydrogen reduction step 32. The reduction end solution from hydrogen reduction step 32 containing a high concentration of ammonium sulphate (e.g. about 450–550 g.p.l. or 7–9 molar $NH_4^+$) is passed to the second stripping stage 22(b) where it is contacted with the resin and, because of its high $(NH_4)_2SO_4$ concentration and low $NH_{3F}$ content, is effective to strip off substantially all nickel remaining on the resin after the first stripping stage. The resin therefore will be fully regenerated and is ready for another loading cycle. Through appropriate control of the volume of stripping solution and recycle liquor the nickel concentration in the product liquor passed to the oxidation and reduction steps can be maintained at a predetermined level, e.g. 50–60 g.p.l. for efficient operation of the reduction step 32.

In the oxidation step 30, solution from the distillation step 24 is charged into a pressure vessel suitable for effecting liquid gas contact and is heated to an elevated temperature, preferably within the range of about 65° to about 260° C., more preferably about 175° to about 230° C. The solution is actively agitated and an oxygen bearing, oxidizing gas, such as air, oxygen or oxygen enriched air, is fed into the solution at a rate sufficient to maintain a positive partial pressure of oxygen, preferably between about 20–80 p.s.i. This operation is continued until substantially all sulphur values in the solution are oxidized to sulphate form. Generally, the operation requires a period of about 2 to 10 minutes. The oxidized solution is then passed to nickel reduction operation 32.

Nickel reduction operation 32 is conducted according to known procedures wherein nickel is preferentially precipitated from aqueous ammonium sulphate solution as a highly purity metal powder by reaction of the solution with hydrogen at elevated temperature and pressure. This process, which is described in detail in numerous prior patents, including, for example, U.S. Pat. Nos. 2,734,821, 2,767,081 and 2,767,083, results in production of elemental nickel powder and reduction end solution containing any cobalt not previously removed, a small residual amount of nickel, ammonium sulphate and minor amounts of impurities such as zinc and manganese. Build-up of these impurities within the system is prevented by bleeding an appropriate amount of reduction end solution from the system and replacing the bled solution with fresh ammonium sulphate solution. The nickel powder product is physically separated from the reduction end solution and, after washing and drying, is ready for the market.

It will be apparent from the foregoing that the process of the invention, when used in conjunction with direct hydrogen reduction for production of elemental nickel, provides an essentially closed-loop system in which all reagents used for separating the metal values from the feed solution are recovered and re-used. It will also be appreciated that the same basic process can be utilized for recovery of other complex ammine forming metals, such as copper, cobalt and cadmium, which are capable of being directly reduced from solution by reaction with hydrogen at elevated temperatures and pressure.

There are numerous specific procedures which may be utilized to carry out the resin loading step of the process of the invention. One preferred method will now be explained with reference to FIG. 2. The pregnant solution may be fed through the resin bed on a once-through basis. However, to obtain both the desired low level of metal in the effluent and substantially total utilization of the metal ammine ion absorbing capacity of the resin for the particular feed solution, it is preferred to load the resin close to its metal absorbing capacity by utilizing two ion exchange resin beds or columns in a cascaded manner, as shown in FIG. 2. In loading columns in a cascaded manner, a freshly regenerated column (column A) is first loaded with the effluent from a second column (column B) which has already been partially loaded with metal ammine ions from partially depleted pregnant liquor. The influent for column B is fresh pregnant liquor and the effluent from column B is partially depleted pregnant liquor. The effluent from column A is barren liquor. When column B is fully loaded and ready for stripping (regeneration) column A is fed with pregnant liquor and a freshly regenerated column (column C) is fed with partially depleted pregnant liquor (column A effluent). While column A is fed with fresh pregnant liquor and the effluent is partially depleted pregnant liquor which is fed to column C, column B is being regenerated.

As previously noted, stripping of the loaded resin can be carried out by contacting the loaded resin with ammonium salt stripping solution in a one-stage once-through operation. With this procedure, it is preferred to utilize stripping solution having an ammonium ion concentration of at least 4 molar and to utilize the minimum volume of stripping solution needed to obtain substantially complete stripping of the complex metal ammine ions from the resin. In this way, the metal concentration in the end solution from the one-stage stripping operation can be maximized.

To completely strip (i.e. regenerate) in one stage a column loaded with metal ammine ions having an ammonia co-ordination of 4 or more, a relatively large volume, e.g. two to three bed volumes of ammonia salt solution, is required and the maximum metal concentration obtainable in the product liquor may, in some cases, be less than that desired for efficient treatment of the product liquor for recovery of the metal values. For example, the desired nickel, copper or cobalt level for the recovery of the metal from the product liquor by direct hydrogen reduction is about 40–80 g.p.l. but such levels are difficult to achieve in a single stage resin stripping operation. However, any predetermined metals concentration up to the limit of solubility of the metal in the stripping solution can be readily achieved when the resin beds or columns are stripped in stages in a split countercurrent manner. A preferred form of this mode of operation is schematically illustrated in FIG. 3.

According to this mode of operation, stripping of any one loaded column is effected in six stages. In stage 1, a small plug of water is introduced into the loaded column to maintain a separation between the pregnant feed liquor and the stripping solution. This minimizes the transfer of impurities, such as chlorides, sulphur, magnesium, etc., from the feed liquor to the stripping liquor and also minimizes the transfer of ammonium salt from stripping solution to the barren feed liquor. Acceptable levels of cross contamination can be achieved utilizing only a very small volume of water plug at the interface to separate the two liquids. Upon exiting from the column, the stage 1 solution is split into two portions with the first exiting portion going along with the displaced pregnant liquor and the second exiting portion joining with the product liquor stream. In stage 2, metal bearing ammonium salt eluant is introduced into the column immediately behind the water plug. The eluant to stage 2 is made up of eluates from stages 3 and 4 which have been combined and treated in Still 2 to remove free ammonia and adjust the free ammonia to metal mole ratio to about 2–2.5. (It should be noted that in this description the eluants to stage 2 and those to stages 3 and 4 as well will have been produced in a preceding stripping cycle since in a given stripping cycle, such as is described here, solutions of the required composition for the eluants are not produced until after they have been required for operation of that cycle; that is, in the actual operation of the process, there is a time lag between the availibility and the need within a given cycle for eluants of the same composition). The eluate from stage 2, along with part of the water plug from stage 1, is distilled in Still 1 to adjust the free ammonia content and produce a product liquor of predetermined metal concentration suitable for subsequent treatment for recovery of the metal values. The eluant for stage 3 is made up from part of the eluate from stage 5 which is first distilled in Still 3 to adjust the free ammonia to metal mole ratio to 2–2.5. The balance of the eluate from stage 5 and a part of the water plug introduced in stage 6 are combined and treated in Still 4 to adjust the free $NH_{3F}/Ni$ mole ratio to about 2–2.5 and this adjusted solution becomes eluant for stage 4. The eluant for stage 5 is ammonium salt solution having an ammonium ion concentration of at least 2 molar and preferably 4–9 molar. By controlling the volume of ammonium salt solution introduced in stage 5 in relation to the amount of metal on the resin at the outset of the stripping, the metal concentration in the product liquor from the stripping operation can be controlled within predetermined limits. In stage 6, another plug of water is introduced into the now substantially completely stripped (regenerated) column to maintain separation between the stripping solution and the solution which is subsequently used to completely displace the stripping solution before the column is again introduced into the loading cycle.

The staged resin column stripping method just described provides a simple and very effective way of effecting substantially complete stripping of a loaded resin column with any predetermined quantity of ammonium salt stripping solution thereby permitting control of the metal concentration in the product liquor up to the solubility limit of the metal while, at the same time, ensuring maximum utilization of the resin loading capacity. Two essential requirements for the operation of the method are the use of a strong (at least 2 molar) ammonium salt stripping solution and adjustment of the free ammonia content of the recycled solutions between these stages such that the predetermined volume of stripping solution introduced in stage 5 is effective to ensure substantially complete stripping of ammonia and metal from the resin between the second and fifth stages.

In the method illustrated in FIG. 3, the ammonia levels in the solutions used as eluants 2, 3 and 4 are adjusted by distillation, preferably to the lowest practical level. The ammonia level in the solution used as eluant 4 may optionally be adjusted by direct acid neutralizaton rather than by distillation since the quantity of ammonia to be neutralized in this eluant is relatively small for removal by distillation. Also, neutralization with acid can provide the make-up ammonium salt e.g. $(NH_4)_2SO_4$ required for operation of the process.

As an alternative to the resin stripping procedure illustrated in FIGS. 1 and 3, the ammonia may be pre-stripped from the resin in an operation which is separate from the nickel stripping operation. For example, according to one such method, ammonia on the resin in excess of 2 moles per mole of nickel on the resin is selectively prestripped from the freshly loaded resin bed by passing water through the bed. The resulting dilute aqueous ammonia solution may then be treated by distillation for ammonia recovery or it may be reused in leaching operations to produce feed solution for the ion exchange operation. The prestripped resin is then eluted with a controlled volume of strong ammonium salt solution to effect stripping the nickel and remaining ammonia. When this method is used in conjunction with a staged stripping operation, fewer ammonia adjustment operations may be required between stripping stages.

When stripping a loaded column, it takes a substantial quantity of eluant to strip the last 3–5% of the metal loaded onto the resin. To minimize the total eluant volume, it is preferred not to strip the last 5% of metal. To accomplish this, counterflow loading and stripping operations are utilized, otherwise the tail will be stripped off during the loading by barren liquor and the desired low level of nickel in the barren liquor will be exceeded. As a result, it is preferred to load the resin columns up-flow and strip them down-flow.

EXAMPLE 1

This example illustrates the loading of various complex metal ammine ions from various ammonium salt solutions and the stripping of the loaded resin with strong ammonium salt solution. A 100 ml bed of DOWEX 50W resin contained in a 2 cm. diameter × 50 cm. glass column was loaded separately with various metals by eluting the bed with 25 bed volumes* of pregnant liquor The pregnant liquors were ammoniacal solutions of approximately 5 g.p.l. metal of the following salts: $CuCl_2$, $Cd(NO_3)_2$, $CoSO_4$ and $Zn(Acetate)_2$. After each separate loading, the pregnant liquor was displaced with 1 B.V. of water and then stripped with ammonium sulphate solution having an ammonium ion concentration of 7 molar to determine the bed loading and the minimum volume of ammonium sulphate required to strip the bed using a single stage, once-through stripping method. The results are summarized in Table I.

* The term "bed volume" (abbreviated "B.V.") as used in this specification means the bulk settled volume of a resin bed in the $NH_4^+$ form $(RNH_4)$ in water

TABLE 1

Loading and Stripping of Metals from Various Liquors on Dowex 50W

| Head Solution, gpl. | | | Resin-Loading | | | Resin Stripping | |
|---|---|---|---|---|---|---|---|
| Metal gpl metal | Anion gpl ion | $NH_{3F}$ | gms Me/l resin | Mole Ratio $NH_{3F}$/Me on Resin | BV* of $(NH_4)_2SO_4$ for 99% Strip | Metal Conc. in $(NH_4)_2SO_4$ Strip Liquor | |
| 5.1 Cu | 10 Cl$^-$ | 80 | 68.1 | 3.3 | 2 | 33.7 | |
| 4.8 Cd | 20 $NO_3^-$ | 80 | 95.5 | 4.3 | 1.75 | 54.6 | |
| 4.9 Co | 20 $SO_4^=$ | 80 | 55.2 | 3.8 | 2 | 27.3 | |
| 4.8 Zn | 20 Acetate$^-$ | 80 | 66.3 | 3.8 | 2.25 | 29.5 | |

*By - bed volumes

EXAMPLE 2

This example illustrates the high loading capacities for nickel and the co-absorption of $NH_3$ as nickel ammine on various types of commercially available gel-type and macroporoustype cationic resins. A 200 ml. volume of resin which was contained in a 3 cm. diameter × 50 cm. glass column was converted to the $NH_4^+$ form by purging with an aqueous ammonium sulphate solution (450 g.p.l. $(NH_4)_2SO_4$. The resin was loaded with nickel by eluting 10 bed volumes of aqueous pregnant liquor containing 12 g.p.l. Ni, 80 g.p.l. $NH_3$ and 60 g.p.l. $CO_2$ and at an elution rate of 0.05 bed volumes per minute. After loading, the residual pregnant liquor was displaced by purging with 2 bed volumes of cold water. The absorbed nickel and ammonia absorbed as nickel ammine were stripped by passing 5 bed volumes of ammonium sulphate solution with 7 molar $NH_4^+$ and at 25° C. The nickel and ammine-ammonia loadings obtained with various gel-type and macroporous-type resins are given in Table II.

TABLE II

| | Loading gms/lt. resin | | Mole Ratio $NH_3$/Ni on Resin |
|---|---|---|---|
| | Ni | $NH_3$—ammine | |
| Gel type Resins: 8–14% Crosslinking | | | |
| Dowex 50W X8 | 40.2 | 69 | 5.9 |
| Dowex 50W X10 | 41.8 | 73 | 6.0 |
| Amberlite 124 | 43.2 | not anal. | — |
| Macroporous type Resins: 15–25% Crosslinking | | | |
| Dowex MSC-1 | 27.5 | 45 | 5.6 |
| Lewatit SP 120 | 20.3 | 28 | 4.8 |
| Amberlite 200 | 25.0 | 42 | 5.7 |
| Ionac CFZ | 40.3 | 66 | 5.6 |

EXAMPLE 3

This example illustrates the product nickel concentration in ammonium sulphate strip liquor that can be achieved by pre-stripping the free ammonia from the column with water. A 200 ml bed of Dowex 50W resin contained in a 3 cm. diameter × 50 cm. glass column was loaded with nickel by eluting the bed with 10 BV of pregnant liquor containing 12 g.p.l. Ni, 80 g.p.l. $NH_3$ and 60 g.p.l. $CO_2$ and the pregnant liquor in the bed voids displaced with water. The bed was eluted with 3.6 BV of water at 70° C. to prestrip much of the ammine ammonia from the resin. The bed was then stripped of nickel and the remaining ammonia by eluting with 0.9 BV of ammonium sulphate liquor (450 g.p.l. $(NH_4)_2SO_4$ at 65° C. The concentrations of the solution are given in Table III. On prestripping the bed with hot water, 53% of the ammine ammonia is removed but less than 1% of the nickel. The dilute ammonia prestrip solution could be returned to the leach circuit as make up water. The product ammonium sulphate solution has a nickel concentration of 44.8 g.p.l. Ni which is much greater than the concentrations that could be obtained by a single pass or two-stage cascade stripping with ammonium sulphate solution without ammonia prestripping. The total volume of eluates is 4.5 BV and required 90 minutes to elute through the resin bed.

TABLE III

| | Volume B.V. | Flow Rate B.V./min | Eluate Conc. g.p.l. Ni | $NH_3$ | M.R. $NH_{3F}$/Ni | Amount Stripped gms/l resin Ni | $NH_3$ |
|---|---|---|---|---|---|---|---|
| Loading 41.6 g.p.l. Ni, 74.3 g.p.l. $NH_3$; M.R. = 6.1 $NH_{3F}$/Ni | | | | | | | |
| Prestrip $H_2O$ | 3.6 | 0.05 | <0.1 | 11 | — | <0.4 | 39.6 |
| $(NH_4)_2SO_4$ Soln. | 0.9 | 0.05 | 44.8 | 38.5 | 2.9 | 40.3 | 34.7 |
| Total | 4.5 | 0.05 | | | | 40.3 | 74.3 |
| Product Soln. | 0.9 | | 44.8 | 38.5 | | | |

EXAMPLE 4

This example illustrates the effect of $NH_3$/metal mole ratio in the ammonium sulphate stripping solution on the stripping efficiency of the metal. A 100 ml bed of Dowex 50W resin contained in a 2 cm. diameter × 50 cm. glass column was equilibrated with various metal ammine sulphate solutions, e.g. Ni, Co, Cu, Zn, Cd, containing approximately 30 g.p.l. metal and at two levels of free ammonia, e.g. 1.9–3.8 and 6.7–7.3 mole ratio $NH_3$/Me in solution. The loaded resin was purged with 1 B.V. of $H_2O$ and then stripped with excess ammonium sulphate to determine the metal and ammonia that was absorbed on the resin after equilibration with the various metal ammine sulphate solutions. The results are given in Table IV. As the mole ratio of $N_3$/metal in solution decreases from 6.7–7.3 to 1.9–3.8, the equilibrium absorption of metal decreases by a factor of 0.49–0.86. This illustrates how maintaining a low mole ratio of $NH_3$/metal in the eluant will enhance the desorption of metal from resin into solution and increase stripping efficiency.

comprised 0.883 B.V. of solution containing 46.7 g.p.l. Ni and 63.7 g.p.l. $NH_{3F}$ at a mole ratio of 4.7 $NH_3$/Ni. This solution can be distilled to reduce the free $NH_3$ concentration to a mole ratio of about 2.2 which is suitable for nickel reduction.

The total bed volumes of stripping eluates and stripping time were 2.57 B.V. and 50 minutes.

EXAMPLE 6

This example illustrates that the product solutions

TABLE IV

Effect of $NH_3$/Metal Mole Ratio in Ammonium Sulphate on Stripping Efficiency

Equilibration Solution: 70 gpl $S_T$ as [$(NH_4)_2SO_4$ + metal sulphate], $NH_{3F}$ and metal as indicated.

| | Equilibration Solution | | | Equilibrated Resin Loading | | | |
|---|---|---|---|---|---|---|---|
| Metal | Metal Conc. gpl | $NH_3$ gpl | Mole Ratio $NH_3$:Me | Metal gms/lt resin | $NH_3$ gms/lt resin | Mole Ratio $NH_3$:Me after purging with 1 BV $H_2O$* | Ratio of Metal Loadings Low $NH_3$/High $NH_3$ |
| Ni | 30.3 | 62.5 | 7.1 | 35.2 | 51.9 | 5.1 | 0.49 |
|    | 30.3 | 16.8 | 1.9 | 17.2 | 11.7 | 2.3 | |
| Co | 30.6 | 59.5 | 6.7 | 34.6 | 46.7 | 4.7 | 0.51 |
|    | 30.6 | 33.0 | 3.7 | 17.6 | 10.8 | 2.1 | |
| Cu | 29.3 | 55.5 | 7.1 | 37.2 | 37.7 | 3.8 | 0.86 |
|    | 29.3 | 23.5 | 3.0 | 32.0 | 25.6 | 3.0 | |
| Zn | 27.0 | 55.5 | 7.8 | 40.8 | 4.5 | 4.2 | 0.82 |
|    | 27.0 | 26.5 | 3.8 | 33.6 | 3.4 | 3.9 | |
| Cd | 30.9 | 34 | 7.3 | 47.7 | 30.9 | 4.3 | 0.41 |
|    | 30.9 | 9 | 1.9 | 19.4 | 6.6 | 2.2 | |

*Some $NH_3$ has been prestripped by $H_2O$

EXAMPLE 5

This example illustrates four stage stripping of a loaded resin column in accordance with the method illustrated in FIG. 3. A 6 liter volume of DOWEX 50W resin contained in a 2 inch diameter × 10 feet column was loaded with pregnant liquor containing 11.1 g.p.l. Ni, 74 g.p.l. $NH_3$, 53 g.p.l. $CO_2$ and 5 g.p.l. S (as $SO_4^{--}$ and $S_2O_3^{--}$). The resin was then stripped with the following consecutive eluants at 65° C.: Water, 3 aliquots of nickel ammine sulphate-ammonium sulphate solution of decreasing nickel concentraion and increasing $NH_4^+$ concentration but constant mole ratio of $NH_3$ free/Ni — 2.2, ammonium sulphate and finally water. The loading and stripping stages were repeated for 12 cycles on the column. The stripping stages are illustrated schematically in FIG. 3 and the volume flow rates and solution concentrations are summarized in Table V.

resulting from ammonium sulphate solution stripping can be subjected to hydrogen reduction to produce nickel powder and a solution suitable for recycling to resin stripping. A composite solution of the product strip liquors from the 12 cycles in Example 5 was prepared. The solution was distilled to reduce the free $NH_3$ to a mole ratio of free $NH_3$/Ni 2.1:1 and then subjected to oxidation with air at 400° C. and 500 p.s.i. to oxidize unsaturated sulphur compounds in the product solution. (These unsaturated sulphur compounds resulted from transfer of residual ammonium carbonate pregnant liquor which contains unsaturated sulphur into the product solution). Six liters of the oxidized solution were heated in an autoclave to 350° F. and under 350 p.s.i. $H_2$ pressure. The nickel in solution was reduced to nickel powder leaving a solution containing a high concentration of ammonium sulphate (7.2 molar ammonium ion) which is suitable for recycle to stripping of the resin columns. The analysis of the solutions and

TABLE V

| Stage | Solution | Volume BV | $NH_4^+$ Molar Conc. in Eluant | Eluant Conc. gpl | | | Corresponding Eluate, gpl | | | Amount Stripped gms/liter resin | |
|---|---|---|---|---|---|---|---|---|---|---|---|
| | | | | Ni | $NH_{3F}$ | M.R. | Ni | $NH_{3F}$ | M.R. | Ni | $NH_{3F}$ |
| 1 | $H_2O$ | 0.083 | 0 | 0 | 0 | — | 2.5 | 43 | (to pregnant liquor) | | |
|   | $H_2O$ | 0.083 | 0 | 0 | 0 | — | 16.0 | 48.5 | 10.4 | 1.33 | 4.0 |
| 2 | NiAmSO$_4$* | 0.8 | 5.8 | 29.4 | 18.8 | 2.2 | 49.9 | 65.3 | 4.49 | 16.4 | 37.2 |
| 3 | NiAmSO$_4$* | 0.4 | 6.4 | 10.5 | 6.6 | 2.2 | 37.1 | 37.1 | 3.43 | 10.6 | 12.2 |
| 4 | NiAmSO$_4$* | 0.4 | 6.7 | 3.4 | 2.2 | 2.2 | 21.6 | 21.0 | 3.33 | 7.3 | 7.5 |
| 5 | $(NH_4)_2SO_4$ | 0.40 | 6.8 | 1.05 | <0.2 | <0.2 | 10.6 | 10.3 | 3.33 | 3.9 | 4.1 |
|   | $(NH_4)_2SO_4$ | 0.27 | 6.8 | 1.05 | <0.2 | <2 | | | | | |
| 6 | $H_2O$ | .13 | 0 | 0 | 0 | — | 3.3 | 4.1 | 4.30 | 0.84 | 16 |
| Total | | 2.57 | | | | | | | | 40.4 | 67.1 |
| Product Solution: | | | | | | | | | | | |
| Before Distillation | | 0.883 | | | | | 46.7 | 63.7 | 4.7 | | |
| After Distillation | | 0.80 | | | | | 52.0 | 33.0 | 2.2 | | |

*Nickel ammine sulphate-ammonium sulphate solution

The product solutions derived by combining eluates from stage 2 and a portion of the eluate from stage 1 powder are given in Table VI.

TABLE VI

| Solution | Analysis, g.p.l. or % Ni | Co | S as (SO$_4$) | Bromate Value | NH$_{3T}$ | NH$_{3F}$ | M.R. NH$_3$/Ni |
|---|---|---|---|---|---|---|---|
| 1. Comp. Product Solution | 54.3 | 0.17 | 107 | 17.6 | 180 | 62.7 | 4.0 |
| 2. After NH$_3$ Evaporation and Oxidation | 51.5 | 0.16 | 115 | 0.4 | 152 | 31.4 | 2.1 |
| 3. After Ni Reduction | <1.0 | 0.16 | 115 | <0.4 | 122 | 0 | |
| Powder | 99.8+ | 0.02 | 0.007(S$_T$) | | | | |

What we claim as new and desire to protect by Letters Patent of the United States is:

1. The process for recovering metals selected from the group consisting of nickel, cobalt, copper, cadmium and zinc from an aqueous ammonium salt feed solution containig values of at least one said metal as dissolved complex metal ammine ions having an ammonia co-ordination of at least two and where the metal is cobalt, said metal being in the twovalent state, which comprises: contacting said metal-containing aqueous solution with a cationic ion exchange resin in the ammonium form in one or more resin loading operations to effect loading of said resin with complex metal ammine ions from said solution, separating the resulting complex metal ammine iondepleted solution from the resulting loaded resin, contacting said loaded resin with an aqueous ammonium salt stripping solution having an ammonium ion concentration of at least two molar to strip ammonia and metal values from said resin, effecting said contacting in two or more stripping stages with fresh stripping solution being contacted in the last such stage with partially stripped resin from a preceding such stripping stage, treating at least a porton of eluate from said last such resin contacting stage to decrease the free ammonia content thereof and using the so-treated eluate as eluant for a preceding stripping stage, controlling the volume of said stripping solution contacted with said loaded resin in relation to the quantity of metal values loaded thereon such that, with substantially complete stripping of metal values from said loaded resin by said stripping solution, the concentration of said metal values in said stripping solution will be within a predetermined range, controlling and corelating the free ammonia and ammonium salt concentrations in said stripping solution such that said controlled volume of stripping solution is effective to substantially completely strip the free ammonia and metal values from the resin, and recovering the resulting metal bearing stripping solution.

2. The process according to claim 1 wherein said resin is sulphonated styrene-divinylbenzene copolymer.

3. The process according to claim 1 wherein the ammonium salt in said feed solution and in said striping solution is ammonium carbonate, sulphate, chloride, nitrate or acetate.

4. The process according to claim 1 wherein the volume of said stripping solution is controlled to produce a product liquor having a predetermined concentration of dissolved metal values which is greater than that of said feed solution.

5. The process according to claim 1 wherein the complex ammine ions loaded on the resin have an ammonia coordination of four or more and at least a portion of the free ammonia loaded on the resin with said ammine ions is selectively stripped from the resin before said resin is contacted with said ammonium salt stripping solution.

6. The process according to claim 1 wherein the complex ammine ions loaded on the resin have an ammonia co-ordination of four or more and at least a portion of the free ammonia loaded on the resin with said ammine ions is selectively stripped from the resin by contacting said resin with fresh water before said resin is contacted with said ammonium salt stripping solution.

7. The process according to claim 1 wherein said metal values are selected from the group consisting of nickel, cobalt, copper and cadmium, said stripping solution is an ammonium sulphate solution, the solution resulting from the stripping operation and containing dissolved values of said selected metal is reacted with a non-sulphidizing reducing gas at elevated temperature and pressure to reduce said selected metal to elemental form and produce a reduction end solution containing ammonium sulphate, and said reduction end solution is utilized to make up, at least in part, said stripping solution.

8. The process according to claim 1 wherein said feed solution is contacted with said resin by passing said solution through a first stationary bed of said resin which has already been partially loaded with metal ammine ions by having previously been contacted with partially depleted feed solution until said partially loaded bed is loaded substantially to its loading capacity with said ions and the solution that has been contacted with said first stationary bed is passed through a second stationary bed of fresh resin until the nickel content of the solution that has been contacted with said second bed reaches a predetermined maximum level at which point said second bed is utilized as the partially loaded bed and the aforesaid resin loading operations are repeated.

9. The process according to claim 1 wherein the free ammonia content is decreased by distilling free ammonia from the solution.

10. The process according to claim 1 wherein the free ammonia content is decreased by addition of sulphuric acid to the solution.

11. The process according to claim 1 wherein said feed solution is an ammoniacal ammonium carbonate solution containing nickel in the form of complex ammine ions with an ammonia coordination of 4 or more, said stripping solution is an ammonium sulphate solution, product solution resulting from the stripping operation is treated by distillation to adjust the free ammonia to nickel molar ratio thereof to about 2.0 to about 2.5, the resulting free ammonia adjusted solution is reacted with hydrogen at elevated temperature and pressure to reduce dissolved nickel values to elemental form and produce a reduction end solution containing at least 1 mole of ammonium sulphate per mole of nickel reduced, and said reduction end solution is recycled to make up, at least in part, said stripping solution.

12. The process according to claim 11 wherein said resin in the ammonium form is contacted with said feed solution by flowing said solution upwardly through a stationary bed of said resin and the loaded resin is contacted with said stripping solution by flowing it downwardly through said stationary resin bed.

13. The process according to claim 12 wherein a plug of water is passed through the loaded resin bed before the bed is contacted with stripping solution and another plug of water is passed through a stripped bed before it is contacted with fresh feed solution whereby intermixing between the ammonium carbonate feed solution and ammonium sulphate eluant solution is minimized.

14. The process according to claim 11 wherein said feed solution is an aqueous ammoniacal ammonium carbonate leach solution containing about 3–20 g.p.l. of nickel and the volume of said stripping solution is controlled to yield a nickel concentration of about 40 to about 80 g.p.l. in the end solution from the stripping operation.

15. The process according to claim 11 wherein said free ammonia adjusted solution is reacted with free oxygen bearing gas at elevated temperature and pressure prior to said reaction with hydrogen to convert any contained sulphur values to sulphate form.

16. The process according to claim 11 wherein the ammonium ion concentration of the stripping solution is between about 7 and 9 molar.

17. The process for recovering nickel values from an aqueous ammoniacal ammonium carbonate feed solution containing nickel as dissolved complex metal ammine ions having an ammonia co-ordination of four or more which comprises: contacting said aqueous solution with a cationic ion exchange resin in the ammonium form to effect loading of said resin with complex nickel ammine ions from said solution, separating the resulting complex nickel ammine iondepleted solution from the resulting loaded resin, contacting said loaded resin in two stripping stages with aqueous ammonium sulphate stripping solution having an ammonium ion concentration of at least two molar to strip substantially all ammonia and nickel values from said resin, said stripping solution being contacted in the second of said two stripping stages with partially stripped resin which has already been contacted with stripping solution in the first of said such two stripping stages, recovering solution from said second stripping stage, treating said recovered stripping solution by distillation to adjust the free ammonia to nickel molar ratio thereof to between about 2.0 and about 2.5, recycling a portion of said free ammonia-adjusted solution to make up the stripping solution for said first stripping stage, recovering the unrecycled portion of said free ammonia-adjusted solution and reacting it with hydrogen at elevated temperature and pressure to reduce dissolved nickel values contained therein to metallic form and produce a reduction end solution containing at least 1 mole of ammonium sulphate per mole of nickel reduced, recovering metallic nickel from said reduction end solution, recycling said reduction end solution to make up at least in part the stripping solution for said second stripping stage and controlling the volume of stripping solution supplied to said first and second stripping stages such that the concentration of nickel values in that portion of stripping solution recovered for treatment in said hydrogen reduction operation is within a predetermined range which is suitable for said hydrogen reduction operation.

18. The process for recovering nickel from an aqueous ammoniacal ammonium carbonate feed solution containing nickel as dissolved complex metal ammine ions having an ammonia co-ordination of four or more which comprises: contacting said aqueous solution with a cationic ion exchange resin in the ammonium form to effect loading of said resin with complex nickel ammine ions from said solution, separating the resulting complex nickel ammine ion-depleted solution from the resulting loaded resin, contacting said loaded resin in four stripping stages with aqueous ammonium sulphate stripping solution having an ammonium ion concentration of at least two molar to strip substantially all ammonia and nickel values from said resin, recovering eluate from the first of said stripping stages as product liquor containing a predetermined nickel concentration, recovering eluate from the second and third of said stripping stages, treating said eluates from said second and third stripping stages by distillation to adjust the free ammonia to nickel molar ratio thereof to between about 2.0 and about 2.5 and utilizing said free ammonia-adjusted eluates as eluant for said first stripping stage, recovering eluate from the fourth of said stripping stages, treating said recovered fourth stage eluate by distillation to adjust the free ammonia to nickel molar ratio thereof to between about 2.0 and about 2.5 and utilizing said free ammonia-adjusted fourth stage eluate in part as eluant for said second stripping stage and in part as eluant for said third stripping stage, reacting said recovered first stage eluate with hydrogen at elevated temperature and pressure to reduce dissolved nickel values contained therein to metallic form and produce a reduction end solution containing at least 1 mole of ammonium sulphate per mole of nickel reduced, recovering metallic nickel from said reduction end solution, recycling said reduction end solution to make up at least in part the eluant solution for said fourth stripping stage and controlling the volume of stripping supplied to said four stripping stages such that the concentration of nickel values in said recovered first stage eluate is within said predetermined range.

19. The process according to claim 18 wherein the free ammonia of the eluant solutions for all but the fourth stripping stage is adjusted by distilling free ammonia from the eluate solution from each stage prior to utilizing it as eluant solution for a preceding stage.

* * * * *